United States Patent Office 3,431,145
Patented Mar. 4, 1969

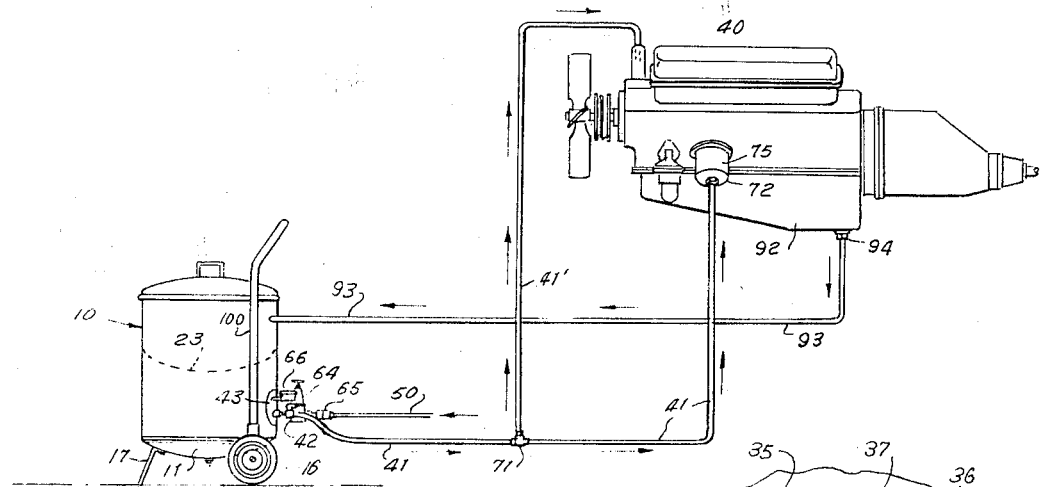
Fig. 1
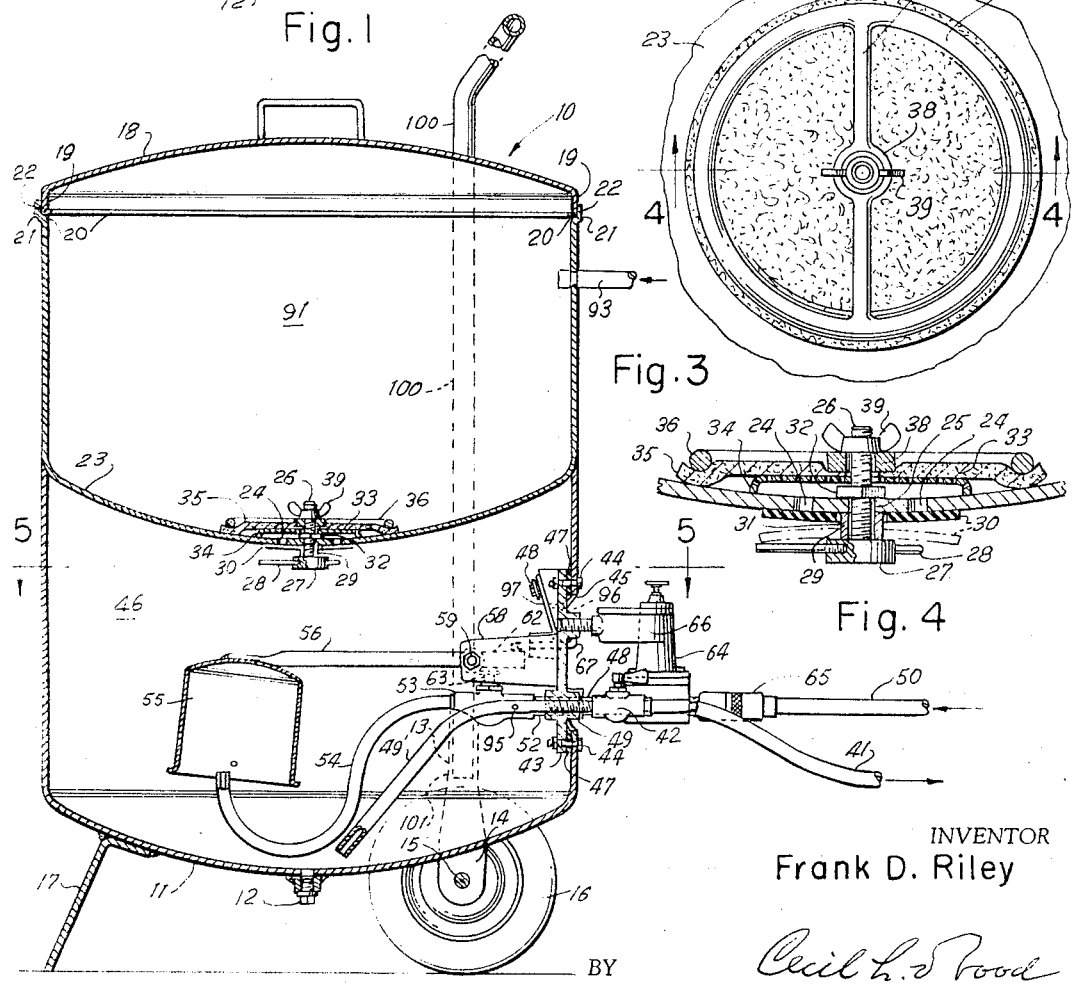
Fig. 2
Fig. 3
Fig. 4
INVENTOR
Frank D. Riley
BY Cecil L. Wood
ATTORNEY March 4, 1969  F. D. RILEY  3,431,145
METHOD FOR FLUSHING AND CLEANING INTERNAL COMBUSTION ENGINES
Filed Nov. 12, 1964  Sheet 2 of 2
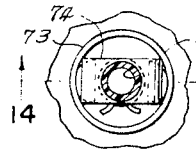
Fig. 13
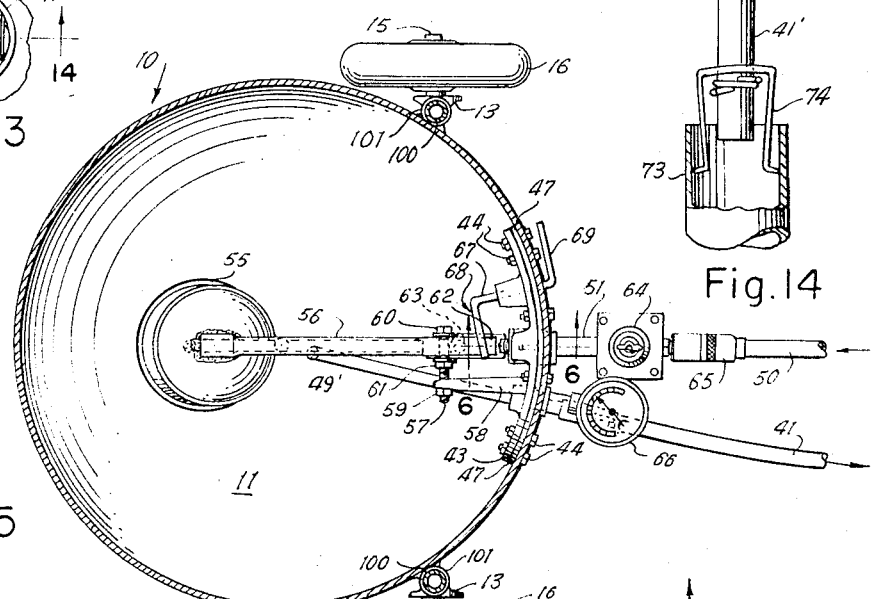
INVENTOR
Frank D. Riley
BY Cecil L. Wood
ATTORNEY

3,431,145
METHOD FOR FLUSHING AND CLEANING INTERNAL COMBUSTION ENGINES
Frank D. Riley, 11103 Lake June Road,
Mesquite, Tex. 75149
Filed Nov. 12, 1964, Ser. No. 410,356
U.S. Cl. 134—22          2 Claims
Int. Cl. B08b 3/10

ABSTRACT OF THE DISCLOSURE

A method for flushing and cleaning the lubricating system of internal combustion engines by injecting thereinto a petroleum derivative solvent from a vessel having upper and lower communicating chambers, with compressed air from the lower chamber, through the oil filter tube, in the upper portion of the system, and the filter opening in the crankcase, simultaneously, and expelling the solvent through the crankcase drain outlet to the upper chamber, filtering the expelled solvent into the lower chamber and repeating the cycle through the lubricating system.

---

This invention relates to a method for flushing and cleaning internal combustion engines, especially of the type used in the propulsion of motor vehicles, to divest the lubricating systems of sludge, dirt, and other foreign matter, which clogs the vital oil ports and lines, preventing proper flow of lubrication through the system.

A variety of devices have been designed for the purpose of circulating solvents, such as kerosene, through the lubricating systems of internal combustion engines, but few of such devices are capable of circulating the solvents throughout the entire lubricating systems and penetrating accumulations of sludge, varnish and paraffin deposits in the oil passages and ports therein to dislodge and remove such obstructions whereby to thoroughly cleanse the system.

A prime object of the invention resides in the provision of a method of injecting, under pressure, a solvent intermixed with air throughout the entire oil flow passages and ports in the lubricating system, including crankshaft and main bearings, cam shaft bearings, valves and valve lifters, and pump, and inducing back pressures to dislodge and clean out any accumulation of sludge therein.

Another object of the invention is that of providing an engine flushing method by which the entire lubricating system can be completely and thoroughly cleansed so as to insure the free passage of oil to all vital parts of the engine at all times and thus prevent excessive friction and minimize wear.

The lubrication system of the conventional automobile engine is supplied from the crank case or oil pan by an oil pump which circulates the lubricant through a myriad of passages and ports to the various working parts of the engine, and the primary flow line from the oil pan is usually provided with a strainer calculated to prevent the passage of dirt, metal filings, and other foreign substances from entering the oil passages. These substances, generally referred to as sludge, tend to build up on the strainer and reduce the flow of lubricant therethrough. Most modern engines are provided with oil filters but such devices are capable of collecting only a portion of the objectionable materials even when frequently replaced.

One of the important objects of the invention, and which comprises a distinctive advantage over methods contrived for a similar purpose, is that of providing a pulsating or turbulent action on the outlet side of the strainer element, by means of an air flow, by which to aid in dislodging accumulated impurities on the intake side of the strainer whereby the undesirable contents of the lubricants can be flushed out of the oil pan after being flushed from the system by the introduction of the solvent, with air mixed therewith, through the filter connection on the engine and the filler tube or breather pipe.

A further object of the invention is that of providing method which is simple and economical in structure and design, easy to install and operate, and thoroughly capable of cycling and recycling the cleansing solvent through the engine, filtering the same between cycles, and affording a method which can be performed by any person of ordinary skill.

Broadly, the invention contemplates the provision of a method for removing all impurities and undesirable substances from the lubricating system of an internal combustion engine, and whereby the useful life and efficiency of the engine will be materially prolonged and enhanced.

While the foregoing objects are paramount, other and lesser objects will become apparent as the description proceeds when considered in connection with the appended drawings wherein:

FIGURE 1 is a schematic illustration of an automobile engine to which is connected a plurality of flow lines communicating from the flushing mechanism.

FIGURE 2 is a vertical sectional view through the apparatus showing upper and lower chambers for containing the contaminated and fresh or filtered solvent, respectively, and illustrating the liquid and air inlet and outlet tubes and air regulator.

FIGURE 3 is a plan view of the solvent filter in the upper chamber of the apparatus, the bottom being shown fragmentarily.

FIGURE 4 is a transverse sectional view, on line 4—4 of FIGURE 3, of the liquid outlet and filter in the bottom of the upper chamber which is shown fragmentarily.

FIGURE 5 is a transverse sectional view, on line 5—5 of FIGURE 2, showing the float, the liquid and air inlet and outlet tubes, float actuated valve, regulator and air gauge.

FIGURE 6 is a vertical sectional view, on line 6—6 of FIGURE 5, of the release valve in a wall of the lower chamber which is fragmentarily shown.

FIGURE 7 is a sectional view of the coupling in the liquid-air outlet line illustrated in FIGURE 1.

FIGURE 8 illustrates a fitting for application of the fluid outlet line to the drain outlet from the crank case or oil pan of an engine.

FIGURE 9 is a fragmentary illustration, partially in section, of an adapter by which the fluid inlet line is connected to the filter connection of an engine.

FIGURES 10, 11 and 12 are sectional illustrations of modified forms of adapters for attaching the fluid inlet line to an engine.

FIGURE 13 is a plan view of the oil filler tube of an engine showing the inlet flow line connected thereinto, the latter being shown in transverse section, and FIGURE 14 is an elevational view, on line 14—14 of FIGURE 13, of the expansion clamp by which the fluid inlet line is attached to the filler tube, the latter being shown fragmentarily in partial section.

The apparatus by which the method is carried out comprises a portable cylindrical container 10 whose bottom 11 is preferably concavo-convex and has a drain plug 12 centrally thereof. A bracket 13 is welded to opposing sides of the lower portion of the container 10 rearwardly of the vertical axis thereof, each having a depending portion 14 at its lower end through which the opposing ends of an axle 15 are arranged for a pair of wheels 16 by which the device is ported. A leg 17 is welded to the bottom 11 opposite the wheels 16 to support the container 10 in upright position, as shown in FIGURES 1 and 2.

A cover 18 affords a closure for the container 10 and has a peripheral depending flange 19 which is seated on a gasket 20 arranged about a shoulder 21 formed by a peripheral offset 22 about the top of the container 10, as shown in FIGURE 2. Intermediate the top and bottom of the container 10 is a partition 23 which is also concavo-convex in form, being curved downwardly, and has a plurality of ports 24 arranged about a central opening 25 through which is arranged a stud 26 having a discular head 27 thereon in which is threaded a plurality of radially extending pins 28, as shown best in FIGURE 4.

The stud 26 is arranged through a sleeve 29 whose ends abut the head 27 and the undersurface of the partition 23 about the central opening 25 therein and provides a spacer which is encircled by a neoprene disk 30 having a central aperture 31. The function of the disk 30 will presently become apparent. A lock nut 32 is threaded on the stud 26 against the upper surface of the partition 23 opposite the sleeve 29.

Arranged about the stud 26 above the nut 32 is a perforated disk 33 having a peripheral depending flange 34 which engages the surface of the partition 23, and overlying the disk 33 is a filter disk 35 of a fibrous material which is retained by a circular frame 36 having an integral transverse member 37 formed intermediate its ends with a circular boss 38 through which the upper end of the stud 26 is extended and on which is threaded a winged nut 39 by which the frame 36 is secured and depressed against the filter disk 35, as shown in detail in FIGURES 2 and 3.

The apparatus is shown schematically connected to an internal combustion engine 40 in FIGURE 1. A flexible fluid outlet tube 41 is connected through a manual valve 42 to a plate 43 secured by bolts 44 in an opening 45 in the lower chamber 46 of the container 10 and is sealed about the opening 45 by a gasket 47. The valve 42 has a threaded nipple 48 which is threaded into a port 49 in the plate 43, and a fluid pick up tube 49' is threadedly connected to the port 49 internally of the plate 43 and depends at an angle toward the bottom 11 of the container 10, as shown in FIGURE 2, terminating near the center thereof.

A compressed air supply line 50 is connected into the lower chamber 46 through a nipple 51 threaded into the plate 43 and communicates with a nipple 52 internally of the plate 43 to which is connected a float actuated valve 53 having a length of tubing 54 connected to its inner end and curved downwardly and upwardly, as shown in FIGURE 2, terminating just inside of a float 55 comprising an inverted cup-shaped element open at its bottom and having its closed top attached, as by welding, to the outer end of an arm 56 whose opposite end is pivotally attached by a bolt 57 to a bracket 58 formed with the inner surface of the plate 43 and projecting at right angles therefrom into the chamber 46.

The bolt 57 extends from one side of the bracket 58, being threaded thereinto and having a lock nut 59 thereon, and the inner end of the arm 56 is pivoted between the head 60 of the bolt 57 and a nut 61, as shown best in FIGURE 5. By this arrangement, since the inner end 62 of the arm 56 extends beyond the bolt 57, the latter provides a fulcrum whereby, when the arm 56 is raised, the inner end engages and depresses the stem 63 of the valve 53 to open the latter to admit air to the chamber 46 to a predetermined pressure, approximately 35 pounds. As the liquid level in the chamber 46 descends the air is automatically shut off.

The air pressure entering the chamber 46 is controlled by a regulator 64 connected in the air line 50 at the outer end of the nipple 51, the line 50 being connected to the regulator 64 by a coupling 65. An air pressure gauge 66 is connected into the plate 43. The air inlet valve 53 can be manually opened by a lever 67 which is rotatably arranged through the plate 43 and has inner and outer right angular portions 68 and 69, respectively, the former being engageable with the inner end 62 of the arm 56 to depress the same and open the valve 53 while the outer member 69 provides a handle for operating the device. The significance of these features will manifest itself as the description proceeds.

OPERATION

The invention, as previously pointed out, is simple in technique yet highly effective in the thorough cleansing of internal combustion engines by the removal of all deleterious impurities in the lubricating system. It is economical to use and is capable of completely and thoroughly cleansing the engine with a relatively small quantity of solvent, such as kerosene, which is inexpensive and readily obtainable.

The flushing operation is performed by first draining the contaminated oil from the engine 40 through the drain outlet in the crank case or oil pan 70. The tube 41, which has a lateral conduit 41' connected therein by a T-coupling 71, shown in detail in FIGURE 7, is connected to an adapter 72 fitted to the filter opening in the engine 40, in the manner shown in FIGURE 1, and the lateral line 41' is connected to the breather pipe or oil filter tube 73 by means of an expansion clamp 74, the latter being shown in detail in FIGURES 13 and 14.

Most of the engines installed in so-called late model automobiles are provided with some type of oil filter which is connected into the lubricating system, but such devices vary in structure and design and are located on different parts of the engine, according to the particular manufacture, so that it has been found expedient to provide a variety of adapters whereby the apparatus of the invention can be readily and effectively applied. Several types of these adapters are illustrated in FIGURES 9 through 12 and will be described in detail.

In FIGURE 9 is shown an adapter 75 which comprises a cylindrical element, similar in form to a conventional type of filter (not shown) having a web 76 in its open end and which has perforations 77 therein arranged about a central internally threaded ported boss 78 in which is threaded a nipple 79 which in turn is threaded into the engine block 40' which has oil flow passages 80 and 71 therein by which the lubricant is caused to flow through the oil filter in normal operation.

The nipple 79 is threaded into the passage 80 whereby the solvent, when injected into the engine, can pass through the nipple and the perforations 77 in the web 76 and through both passages 80 and 81 into the lubricating system. The adapter 75 is seated on a gasket 82 and the flow line 41 is connected to a fitting 83 in the closed end of the member 75. This arrangement is shown as applied to the engine 40 in FIGURE 1.

In FIGURES 10 and 11 are shown modifications of the adapter which comprise discular plates 84 and 85, respectively, attached by a stud bolt 86 to the block 40' to cover the recess 87 by which the oil passages 80 and 81 are connected through the conventional filter (not shown). The flow line 41 is connected through the plates 84 or 85 by a fitting 83 in the same manner as in the arrangement shown in FIGURE 9. In both structures shown in FIGURES 10 and 11 the plates 84 and 85, while differing slightly in design, are seated on a gasket 88.

In FIGURE 12 the flow line 41 is connected to the block 40' by a fitting 89 threaded into a port 90 which may be an opening for a signal switch, if the particular engine is not equipped with a filter, or for some other purpose.

The steps of the flushing process are carried out by first depositing a quantity (approximately eight quarts) of kerosene, or other suitable solvent, in the upper chamber 91 above the partition 23 and the cover 18 is placed in position, as shown in FIGURE 2. There being no air pressure in the container 10 the liquid solvent will flow through the filter disk 35 into the lower chamber 46, the neoprene disk 30 being relaxed, as shown in broken lines in FIGURE 4, and the ports 24 being uncovered.

When the solvent has passed into the lower compartment 46 the air line 50 is coupled to the regulator 64 and the air valve at the source (not shown) is opened to admit air into the chamber 46 passing through the tube 54. The float 55 has now been raised to a level by which the air valve 53 is open.

Air pressure in the chamber 46 will force the solvent out through the line 41 and its lateral 41′ into the engine lubricating system through which it will circulate and pass out through the drain opening in the crank case or oil pan 92 to which a return line 93 is attached by a fitting 94, as shown in FIGURES 1 and 8, and whose opposite end extends through the wall of the upper chamber 91, as best shown in FIGURE 2.

At this stage the air pressure in the lower chamber 46 has caused the neoprene disk 30 to close the ports 24 in the partition 23, and since there is no pressure in the upper chamber 91 the solvent, which has now become impregnated with the sludge and impurities flushed from the lubricating system of the engine 40, is retained in the chamber 91 until the float 55 in the lower chamber 46 drops to cause the air valve 53 to close.

The air pressure having been exhausted from the lower chamber 46 the solvent flows by gravity thereinto through the filter disk 35, which removes the foreign substances therefrom, and causes the float 55 to be raised to open the air valve 53 to repeat the cycle through the engine 40. For the best results, this cycle should be repeated several times, depending upon the condition of the lubricating system being cleansed. The engine should be slowly operated during the circulation cycles by the use of a battery actuated starting motor.

As the solvent is forced out of the chamber 46 through the tube 50 air is admitted into the latter through a relatively small orifice 95 therein near the outlet end of the tube 50, shown in FIGURE 2, whereby air is mixed with the liquid solvent to produce an agitating or pulsating effect upon the parts to be cleaned, particularly the strainer which is usually arranged in the system in the oil pan or crankcase 92.

The agitating action produced by the injection of air into the system is of great importance since it is highly difficult to dislodge such substances as sludge, dirt, varnish and paraffin deposits from the mesh usually provided to strain out these undesirables from the lubricant. The pulsating action of the air under pressure will also aid materially in the removal of the undesirable substances from small passages, ports and other engine parts.

When pressure is released from the lower chamber 46, and to avoid a vacuum therein, air may enter through a port 96 in the upper portion of the plate 43 which is normally closed from the inside by a neoprene flap valve 97 attached to the plate 43 by a cap screw 98, as shown in detail in FIGURE 6. The flap valve 97 is subject to the internal air pressure of the chamber 46 while the solvent is being circulated through the engine 40 to close the port 96.

The container 10 is easily ported on its wheels 16 by the handle 99 which is of tubular construction having its legs 100 received in sockets 101 formed with the brackets 13 to which the axle 15 is attached.

The method herein described, and embodying the invention, is capable of certain changes and modifications in application, by persons skilled in the art, without departing from the inventive concept as described in the appended claims.

What is claimed is:
1. The method of cleaning and flushing the lubricating system of an internal combustion engine having a crankcase, an oil filler tube in the upper portion of the system and a drain outlet for the crankcase in the lower portion of the system, and a filter opening in the crankcase, using a vessel having upper and lower chambers and a valved communication therebetween, after draining the crankcase, the steps comprising: confining a petroleum derivative solvent in the lower chamber of said vessel and introducing air under pressure therein; releasing the solvent intermingled with air at a predetermined rate and injecting it into the system through the filler tube and the filter opening simultaneously to produce a pulsating action in the system, while slowly operating the engine and expelling the solvent through the drain outlet to the upper chamber of said vessel, filtering the solvent by gravity into the lower chamber thereof, and repeating the cycle.

2. A method for cleaning and flushing the crankcase and lubricating system of internal combustion engines, the crankcase having a filler tube and drain outlet, and a filter opening, after draining the crankcase and using a vessel having upper and lower communicating chambers, the steps comprising: confining a petroleum derivative solvent in the lower chamber of said vessel and inducting air under pressure thereinto, releasing the solvent intermingled with the air at a predetermined rate into the system through the filler tube and the filter opening simultaneously in opposing directions while slowly turning the engine and expelling the solvent through the drain outlet to the upper chamber, filtering the solvent by gravity into the lower chamber, and repeating the cycle.

References Cited

UNITED STATES PATENTS

| | | | |
|---|---|---|---|
| 1,509,327 | 9/1924 | Winchester | 134—22 |
| 1,884,820 | 10/1932 | Osborne | 134—23 XR |
| 2,366,073 | 12/1944 | Vallerie | 134—21 |
| 2,454,585 | 11/1948 | Alderman | 134—23 XR |
| 2,493,120 | 1/1950 | Eaton | 134—30 XR |
| 2,525,978 | 10/1950 | Vallerie | 134—21 |

MORRIS O. WOLK, *Primary Examiner.*

J. ZATARGA, *Assistant Examiner.*

U.S. Cl. X.R.

134—10, 21, 23, 30, 166, 169